(No Model.)
W. ZAEHRINGER.
CAR COUPLING.
No. 300,186. Patented June 10, 1884.
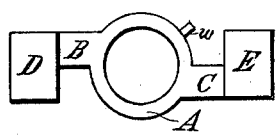
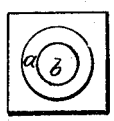
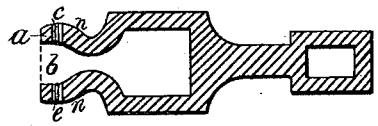
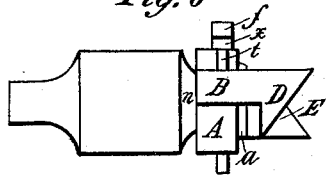
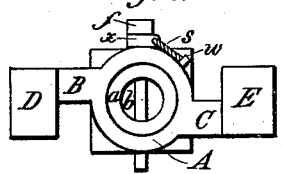
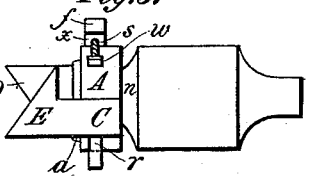
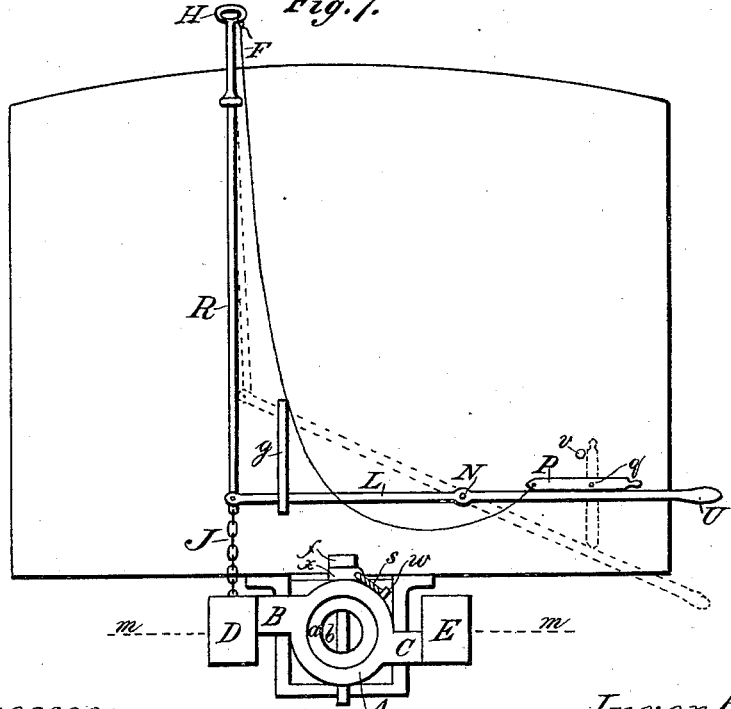
Witnesses:
Inventor:

UNITED STATES PATENT OFFICE.

WILLIAM ZAEHRINGER, OF NEW ORLEANS, LOUISIANA, ASSIGNOR OF ONE-HALF TO CHAS. W. DOYLE, OF SAME PLACE.

CAR-COUPLING.

SPECIFICATION forming part of Letters Patent No. 300,186, dated June 10, 1884.

Application filed July 16, 1883. (No model.)

*To all whom it may concern:*

Be it known that I, WM. ZAEHRINGER, a citizen of the United States, residing at New Orleans, in the parish of Orleans and State of Louisiana, have invented a new and useful Improvement in Automatic Car-Couplings; and I do hereby declare the following to be a full, clear, and correct description of the same, reference being had to the annexed drawings, making a part of this specification.

The object of this invention is, first, to provide a passenger and freight car coupling being automatic, thereby obviating the necessity of going between the cars to couple and uncouple by hand; second, a coupling adapted to couple cars of various heights with the same facility as those having a uniform height at the coupling-point; third, a coupling that will always couple when set, no matter what two ends of two cars come together; fourth, a coupling that can be uncoupled with facility from the top of either car, also from either side of the train; fifth, a coupling that can be set to obviate coupling from the top of either car or from either side of the train; sixth, a coupling that will make a curve with perfect security; seventh, a coupling that can be uncoupled and coupled on a curve with facility; eighth, a coupling that will instantly uncouple itself when a car jumps the track; ninth, a coupling that can be coupled to any "foreign" car using the common link and pin. To accomplish these ends I have invented a simple, strong, and effective device, as shown in the annexed drawings, of which—

Figure 1 is a front view of the draw-head. Fig. 2 is a longitudinal section of the draw-head. Fig. 3 is the coupling, consisting of two jaws, two arms, and a collar. Fig. 4 is a front view of the draw-head with the coupling attached and held in position by means of a pin and spring. Fig. 5 is a right-hand side view of draw-head, coupling, pin, and spring. Fig. 6 is a left-hand side view of draw-head, coupling, and pin. Fig. 7 shows the coupling and draw-head, in connection with the uncoupling apparatus, attached to the end of a freight-car.

To understand the construction and operation of this invention, we will refer to Fig. 1, representing a full front view of a draw-head, made of cast-iron or other suitable material, having a round facing, *a*, and an opening, *b*, for receiving the link whenever necessary to couple to a foreign car.

Fig. 2 is a longitudinal section of the draw-head, showing the facing *a* and rounded neck *n*, the opening *b*, and the pin-holes *c* and *e*.

Fig. 3 represents the coupling consisting of a collar, A, arms B and C, and jaws D and E. These jaws, arms, and collar are made in one piece, of any suitable material.

Fig. 4 shows the coupling attached to the draw-head, and securely held in the position indicated by the pin *f*, running through the pin-holes *c e* of the neck *n*, Fig. 2, and through a slot in the collar A at the top, and another slot at the bottom of said collar, said slots being made to correspond in width to the diameter of the pin *f*, the upper slot extending from the right-hand side of the pin toward the left a distance of about four inches, the lower slot extending from the left-hand side of the pin toward the right a corresponding distance. These slots in the collar are necessary to allow it to partially revolve upon the neck *n* of the draw-head in the act of coupling and uncoupling.

*s* is a spiral spring secured at one end to a collar, *x*, on the pin *f*, at the other end to a stud, *w*, on the collar A, serving to pull the collar A against the pin *f* as far as the slots will admit, thus keeping the jaws D and E in readiness to couple with its opposite mate when set in like manner.

Fig. 5 is a right-hand side view of the coupling and draw-head, showing the position of the collar A on the neck *n*, also the inside part of the left-hand jaw D, the right-hand jaw E, arm C, pin *f*, collar *x*, stud *w*, and right-hand lower slot, *r*.

Fig. 6 is a left-hand side view of the coupling and draw-head, showing the position of the collar A on the neck *n*, also the inside part of the right-hand jaw E, the left-hand jaw D, arm B, pin *f*, collar *x*, and left-hand upper slot, *t*.

To illustrate the manner of coupling two cars, we will suppose that Fig. 6—a draw-head and coupling—is attached to a freight-car, and Fig. 5—another draw-head and coupling—is attached to another freight-car. We will designate the car on the right "No. 5," and the car on the left "No. 6." Desiring to couple, either car is backed up against the other, when the lower jaw, E, of No. 5 will strike the upper jaw, D, of No. 6, and at the same time the upper jaw, D, of No. 5 will strike the lower jaw, E, of No. 6. It is obvious that when these jaws come in contact the slotted collars A, guided by the pins f, will turn in opposite directions, and as soon as the faces a of each draw-head come in contact the points of the jaws E D on one side and D E on the other side will have crossed each other and completed a coupling through the action of the springs s on each collar in replacing the jaws as they were before meeting. When car No. 5 pulls No. 6, the lower jaw, E, of No. 5 pulls against upper jaw, D, of No. 6, and the upper jaw, D, of No. 5 pulls against lower jaw, E, of No. 6, thus equalizing the draft and transferring it, through the collar A, to the pin f on each draw-head. Upon reaching a curved track the collars A are enabled to adjust themselves to the required angle, owing to the rounded form of the neck n on each draw-head, thereby still equalizing the draft, as when running upon a perfectly-straight track.

To uncouple from the top of a car, we will refer to Fig. 7, which is a full end view of a freight-car with a coupling and draw-head attached, as already described. For this purpose I provide a rod, R, with a handle, H, at the upper end, and a chain, J, below, said chain being secured to the top of jaw D. By pulling up the handle H the jaw D is raised, and when its lower edge has passed above the horizontal line m the upper edge of the jaw E will have passed below said line, thus freeing themselves from the jaws of the opposite coupling. To uncouple from the side of the car, a lever, L, is provided, working on pivot N, one end being secured by a pin to the rod R, the other end forming a handle, U, extending conveniently out to the side of the car.

g is a guide fastened to the car, serving to keep the lever in position. When desired to uncouple, pull downward the handle U until the jaws D and E have passed the horizontal line m, as before mentioned, when the jaws will be freed from their mates.

To obviate coupling, a pawl, P, is provided, playing on a pin, q, and gaged by a stud, v. When the lever L is lowered sufficiently, the pawl P will drop down, its end resting upon said lever, forcing it to retain the position shown by the dotted lines, and the jaws D and E are held safely out of coupling distance for the approaching mate that is set to couple. When desired from below to reset the jaws, the pawl P is pulled outward at its upper end; the lever being released, the spring s again draws the collar A, with its jaws D E, into the proper position for coupling. Should it be desired to reset the jaws from the top of the car, the cord (or chain) F, secured to the handle H and pawl P, is given a quick, sharp pull, thereby releasing the lever L, and consequently resetting the jaws, as before mentioned. From the manner in which the jaws engage with each other it is evident that they will instantly uncouple when a car jumps the track, thus often saving from destruction a whole train of cars, besides life, limb, and property. To couple with a foreign car, raise the pin f until the link is introduced into the opening b, replace the pin f, and the coupling to a foreign car is effected without much loss of time or trouble.

I am aware that a car-coupling composed of coupling-hooks which are at the end of a draw-bar arranged upon the car to turn in bearings thereof is not new; also, adapted to rotate or turn is not new.

Having described my invention, what I claim as new, and desire to secure by Letters Patent, is—

1. An open, round-faced, and ball-shaped bumper and draw-bar, a, adapted to receive a collar, A, substantially as and for the purpose set forth.

2. A slotted, armed, and hooked collar, A, to be secured to the draw-bar a, substantially as described.

3. The combination of the open round-faced ball-shaped bumper and draw-bar a with the slotted, armed, and hooked collar A, secured to said bumper and draw-bar by means of a pin, f, and spring s, permitting the hooks of said collar, when coupled, to adjust themselves upon both sides of said bumper and draw-bar to the various angles formed in running around curves, thereby equalizing the draft upon hooks D E and their mates, substantially as described.

4. The combination of the draw-bar a and collar A with the pin f, collar x, spring s, and stud w, arranged substantially as and for the purpose set forth.

5. The combination of the draw-bar a, collar A, pin f, collar x, spring s, and stud w with a rod, R, chain J, and lever L, arranged substantially as and for the purpose set forth.

6. The combination of rod R, chain J, and lever L with a pawl, P, stud v, and cord (or chain) F, arranged substantially as and for the purpose set forth.

In testimony whereof I have hereunto signed my name.

WM. ZAEHRINGER.

Witnesses:
ANDREW HERO, Jr.,
B. SWITZER.